2,772,289

BASIC ESTERS OF N-ARALKYL-N-ARYL-CARBAMIC ACIDS AND THE MANUFACTURE THEREOF

John W. Cusic, Skokie, Ill., assignor, by mesne assignments, to G. D. Searle & Co., Skokie, Ill., a corporation of Delaware No Drawing. Application March 26, 1953,
Serial No. 344,883

14 Claims. (Cl. 260—326.3)

This invention relates to basic esters of N-aralkyl-N-arylcarbamates, to salts thereof and to methods of preparing such esters and salts. In particular, this invention relates to basic esters of the following general formula

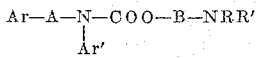

wherein Ar and Ar' are isocyclic aryl, haloaryl or lower alkoxyaryl radicals, A and B are lower alkylene radicals, and NRR' is a non-aromatic amino radical.

The compounds of my invention possess a number of highly valuable medicinal properties. They are unusually potent atropinoid and ganglion blocking agents. I have found that it is essential for this combination of activities that the nitrogen atom of the carbamyl group be substituted by both an aralkyl and an aryl radical, since neither the N,N-diaryl nor the N,N-dialkyl substituted carbamates have shown comparable properties. In addition the claimed compounds have shown a quinidine-like regulatory action on the heart and other valuable cardiovascular effects such as coronary dilation and depression of hypertensive blood pressure levels. Further, they have been shown to cause the release of adrenocorticotrophic hormone from the pituitary gland.

In the foregoing formula Ar represents an isocyclic aryl radical (containing only carbon atoms in the nucleus), a lower alkoxylated aryl radical or a halogenated aryl radical, optimally containing no more than 10 carbon atoms. Among these radicals are phenyl, naphthyl, and lower alkylated phenyl radicals such as tolyl, xylyl, diethylphenyl and the like as well as their halogen and lower alkoxy substitution products. The radical A represents a lower alkylene radical such as methylene, ethylene, propylene, butylene, amylene, hexylene, ethylidene, propylidene, and similar bivalent saturated hydrocarbon radicals containing not more than 6 carbon atoms. The radical B is a lower alkylene radical such as ethylene, propylene, butylene, trimethylene, pentamethylene and the like, which separates the oxygen and nitrogen atoms attached thereto by at least two carbon atoms. The amino group NRR' represents secondary and tertiary amino radicals which are non-aromatic in character. It includes lower monoalkylamino radicals such as methylamino, ethylamino, propylamino, isopropylamino, butylamino, isobutylamino, secondary-butylamino, isoamylamino, hexylamino, isohexylamino, and related radicals. It also includes lower dialkylamino radicals such as diethylamino, dipropylamino, dibutylamino, diamylamino, dihexylamino, diisohexylamino, methylpropylamino, methylbutylamino, ethylpropylamino, and similar radicals. The amino group, NRR', may contain substituted alkyl radicals such as β-hydroxyethyl, β-chloroethyl, γ-hydroxypropyl, β,γ-dihydroxypropyl, β-acetoxyethyl, carboethoxymethyl, β-carboethoxyethyl, β-carbomethoxypropyl, β-bromoethyl, γ-bromopropyl and the like. The radicals R and R' can also represent lower alkenyl radicals such as allyl and methallyl. The amino radical NRR' also includes non-aromatic heterocyclic amino radicals such as morpholino, 4-methylpiperazino and related saturated heterocyclic amino radicals. Of special interest are radicals wherein NRR' is a cyclic radical of the type , Z being an alkylene radical of 4 to 9 carbon atoms of which 4 to 5 are in nuclear position as in the case of pyrrolidino, dimethylpyrrolidino, piperidino, pipecolino and diethylpiperidino radicals. The amino group, NRR', therefore represents non-aromatic amino radicals derived from amines having dissociation constants in the range of about $10^{-3}$ to $10^{-5}$.

The organic bases of the foregoing type form salts which are non-toxic in therapeutic dosage with a variety of inorganic and strong organic acids including sulfuric, phosphoric, hydrochloric, hydrobromic, sulfamic, citric, lactic, maleic, malic, succinic, tartaric, cinnamic, acetic, benzoic, gluconic, and related acids. They also form quaternary ammonium salts with a variety of organic esters of sulfuric, hydrohalic, and aromatic sulfonic acids. Among such esters are methyl chloride, ethyl chloride, propyl bromide, butyl chloride, isobutyl bromide, ethyl chloroacetate, β-bromoethyl acetate, methyl β-bromopropionate, ethylene bromohydrin, ethylene chlorohydrin, propylene bromohydrin, benzyl chloride, benzyl bromide, phenethyl bromide, naphthylmethyl chloride, dimethyl sulfate, diethyl sulfate, methyl benzenesulfonate, ethyl toluenesulfonate, propyl toluenesulfonate, propyl chlorohydrin, γ-hydroxypropyl bromide, allyl chloride, methallyl chloride, crotyl bromide, and the like.

The compounds of this invention can be prepared by reacting two or more equivalents of an amine of the formula

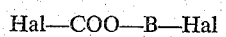

with one equivalent of a haloalkyl halocarbonate (also known as haloformate) of the formula Hal—COO—B—Hal wherein Hal is a halogen atom of atomic number greater than 9 and includes chlorine, bromine, and iodine, all other symbols being defined as hereinabove. This reaction is preferably carried out at low temperature (0–25° centigrade) in an inert solvent. The reaction can also be conducted in an aqueous medium in the presence of caustic alkali, avoiding an excess of the amine. The resulting haloalkyl disubstituted carbamate has the formula

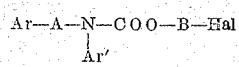

This halogenated ester is then reacted with two or more equivalents of a monoalkyl, dialkyl or saturated heterocyclic amine, generally at temperatures in the range of 50–150° C. The basic ester so formed is removed by conventional procedures and may be purified by distillation or by conversion to a crystalline salt.

The compounds of this invention may also be prepared by reacting a secondary amine of the formula

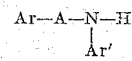

with phosgene in an inert solvent to form a disubstituted carbamyl chloride of the formula

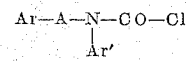

The latter is reacted with an amino alcohol of the formula

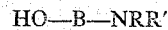

generally in an inert solvent at temperatures in the range of 25–150° C.

The following examples illustrate in more detail the present invention without, however, limiting it thereto.

The relative quantities of materials are given in parts by weight, temperatures in degrees centigrade (°C.) and pressures in millimeters (mm.) of mercury.

Example 1

A solution of 71.5 parts of β-chloroethyl chlorocarbonate in 500 parts of dry ether is added to an agitated solution of 183 parts of benzylaniline in 500 parts of dry ether at 0° C. After the addition the reaction mixture is stirred for an hour, then filtered and the filtrate is evaporated under vacuum. The residue consists mainly of β-chloroethyl benzylcarbanilate as a thick oil. 29 parts of this chloro ester are added to a solution of 12 parts of dimethylamine and 1 part of potassium iodide in 80 parts of methyl ethyl ketone. The resulting solution is heated for five days at 60° C. in a closed vessel. The reaction mixture is mixed with cold dilute hydrochloric acid and with ether and the aqueous layer is separated, made alkaline and extracted with ether. The ether extract is dried and evaporated leaving a residue of β-dimethylaminoethyl benzylcarbanilate. This is dissolved in anhydrous ether and reacted with an equivalent of absolute alcoholic hydrogen chloride. The residue of the hydrochloride of β-dimethylaminoethyl benzylcarbanilate soon solidifies. It melts at 108–109° C. after recrystallization from ethyl acetate using activated charcoal.

Example 2

20 parts of β-dimethylaminoethyl benzylcarbanilate are dissolved in a cold solution of 6 parts of methyl chloride in 60 parts of methyl ethyl ketone. The resulting solution is heated for about 15 hours at 60° C. in a closed vessel. The reaction mixture is cooled and the precipitate of the methochloride of β-dimethylaminoethyl benzylcarbanilate is collected on a filter and dried. It melts at 174–175° C.

Example 3

A mixture of 10 parts of β-dimethylaminoethyl benzylcarbanilate, 8.8 parts of methyl bromide and 400 parts of methyl ethyl ketone is permitted to stand at room temperature for 90 minutes. The methobromide of β-dimethylaminoethyl benzylcarbanilate is collected on a filter and recrystallized from isopropanol. It melts at 198–199° C.

Example 4

A mixture of 10 parts of β-dimethylaminoethyl benzylcarbanilate, 11.4 parts of methyl iodide and 400 parts of methyl ethyl ketone is kept at 0° C. for 12 hours and treated with ether. The resulting oily precipitate is separated, dissolved in isopropanol and chilled. The methiodide of β-dimethylaminoethyl benzylcarbanilate precipitates in crystals melting at 150–151° C.

Example 5

32 parts of β-chloroethyl benzylcarbanilate, 16 parts of n-butylamine and 0.5 part of potassium iodide in 35 parts of methyl ethyl ketone are heated at 85° C. in a closed vessel for 12 hours. The reaction mixture is evaporated and the residue is treated with ice, dilute hydrochloric acid and ether. The aqueous layer is separated, made alkaline and extracted with ether. This extract is dried and evaporated and the resulting β-(n-butyl)aminoethyl benzylcarbanilate is distilled at about 205–215° C. and 1 mm. pressure.

Example 6

A solution of 243 parts of β-chloroethyl chlorocarbonate in 1000 parts of dry ether is added slowly with good agitation to a solution of 630 parts of benzylaniline in 1300 parts of dry benzene at 0° C. After the addition the mixture is agitated for a few hours at low temperature, then filtered and evaporated. On standing the residue of β-chloroethyl benzylcarbanilate crystallizes. After recrystallization from petroleum ether it melts at about 35° C.

160 parts of β-chloroethyl benzylcarbanilate, 80 parts of diethylamine and 2 parts of potassium iodide in 165 parts of methyl ethyl ketone are heated at 85° C. in a closed vessel for 6 days. The reaction mixture is evaporated and the residue is dissolved in cold dilute muriatic acid and agitated with ether. The aqueous layer is removed, made alkaline and extracted with ether. The ether extract is dried and evaporated and the residue of β-diethylaminoethyl benzylcarbanilate is distilled at 208–210° C. at 1 mm. pressure. It forms a crystalline hydrochloride which melts at 106–107° C. after recrystallization from ethyl acetate.

Example 7

15 parts of β-diethylaminoethyl benzylcarbanilate and 15 parts of methyl bromide in 50 parts of methyl ethyl ketone are heated at 85° C. for 30 minutes in a closed vessel and then chilled. The crystalline methobromide is removed by filtration, washed and dried. It melts at 126–127° C.

Example 8

A solution of 15 parts of β-diethylaminoethyl benzylcarbanilate and 19 parts of ethyl iodide in 50 parts of methyl ethyl ketone is heated at 85° C. for 30 minutes in a closed vessel. Upon chilling, the crystalline ethiodide is obtained which melts at 149–150° C.

Example 9

A solution of 366 parts of benzylaniline in 1300 parts of dry benzene is added slowly to a chilled solution of 99 parts of phosgene in 435 parts of dry toluene diluted with 1000 parts of dry ether. The reaction mixture is allowed to stand at low temperature for about 12 hours, then filtered and evaporated leaving an oily residue of benzylcarbanilyl chloride. On standing this product crystallizes and after recrystallization from petroleum ether it melts at 47–48° C.

A solution of 170 parts of benzylcarbanilyl chloride and 200 parts of γ-diethylaminopropanol in 1700 parts of dry xylene is refluxed for 4 hours. The supernatant liquid is decanted and extracted with dilute muriatic acid. The acid extract is made alkaline and extracted with ether. This ether extract is dried and evaporated. The residue of γ-diethylaminopropyl benzylcarbanilate distills at 212–214° C. at 1 mm. pressure.

Treatment of an ether solution of this base with a 25% solution of hydrogen chloride in isopropanol yields the initially oily hydrochloride which solidifies on standing at 0° C. Recrystallized from ethyl acetate it melts at 110–111° C.

Example 10

A mixture of 10 parts of γ-diethylaminopropyl benzylcarbanilate and 19 parts of ethyl iodide in 40 parts of methyl ethyl ketone is kept at 0° C. for 15 hours and then diluted with dry ether. The precipitate of γ-diethylaminopropyl benzylcarbanilate ethiodide soon crystallizes. It is separated, washed and dried. The crystals melt at 132–133° C.

Example 11

A solution of 490 parts of benzylcarbanilyl chloride and 262 parts of β-diethylaminopropanol in 2500 parts of methyl ethyl ketone is refluxed for three days and then evaporated at steam temperature. The residue is mixed with dilute hydrochloric acid and ether. The acid layer is separated, made alkaline and extracted with ether. The ether extract is dried and evaporated. The residue of β-diethylaminopropyl benzylcarbanilate distills at 202–205° C. at 3 mm. pressure.

10 parts of the above basic ester and 23 parts of methyl iodide in 40 parts of methyl ethyl ketone are heated at 85° C. for 15 hours in a closed vessel. The precipitate of β-diethylaminopropyl benzylcarbanilate methiodide is removed, washed and dried. It melts at 132–134° C.

*Example 12*

A mixture of 50 parts of benzylcarbanilyl chloride and 27 parts of isopropylethylaminoethanol in 1700 parts of anhydrous toluene is refluxed for 10 hours, cooled and extracted with dilute hydrochloric acid. The aqueous layer is made alkaline and extracted with ether. The ether extract is dried and evaporated to yield the N-isopropylethylaminoethyl benzylcarbanilate which is distilled at about 172–175° C. and 2 mm. pressure. Its hydrochloride, crystallized from ethyl acetate, melts at 121–122° C.

*Example 13*

A solution of 15 parts of N-isopropylethylaminoethyl benzylcarbanilate and 17.3 parts of methyl bromide in 75 parts of chloroform is heated in a closed vessel at 80° C. for 10 hours, freed from solvent under vacuum, cooled and treated with ether. The resulting oil is separated and crystallized from ethyl acetate. The methobromide thus obtained melts at 123–125° C. It has the structural formula

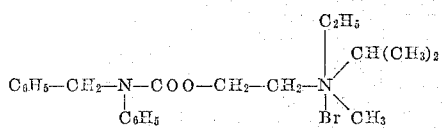

*Example 14*

A solution of 491 parts of benzylcarbanilyl chloride and 290 parts of di-n-propylaminoethanol in 1700 parts of toluene is heated at reflux temperature for 10 hours, cooled and extracted with dilute hydrochloric acid. The extract is made alkaline and extracted with ether. This ether extract is dried and distilled at 183–185° C. and 2 mm. pressure. The β-di-n-propylaminoethyl benzylcarbanilate thus obtained yields a hydrochloride which, recrystallized from ethyl acetate, melts at about 121–123° C.

*Example 15*

A solution of 14 parts of β-di-n-propylaminoethyl benzylcarbanilate, 17.3 parts of methyl bromide and 75 parts of chloroform is heated in a closed vessel at 80° C. for 12 hours, concentrated, cooled and treated with ether. The resulting oil is separated and dissolved in a mixture of ethyl acetate and isopropanol. On cooling the methobromide of β-di-n-propylaminoethyl benzylcarbanilate precipitates which melts at 134–135° C.

*Example 16*

A solution of 15 parts of β-di-n-propylaminoethyl benzylcarbanilate, 22.8 parts of methyl iodide and 400 parts of chloroform is heated at 80° C. for 12 hours, concentrated, and cooled. On treatment with ether the methiodide separates as an oil. Crystallized from isopropanol, this salt melts at 141–142° C.

*Example 17*

A solution of 50 parts of benzylcarbanilyl chloride and 58 parts of β-diisopropylaminoethanol in 255 parts of xylene is refluxed for fifteen hours. The reaction mixture is cooled and the supernatant liquid is decanted from the precipitate and extracted with dilute hydrochloric acid. The acid extract is made alkaline and extracted with ether. The ether extract is dried and evaporated. The residue of β-diisopropylaminoethyl benzylcarbanilate distills at 198–200° C. at 1 mm. pressure. It forms a crystalline hydrochloride which after recrystallization from ethyl acetate melts at 137–138° C.

*Example 18*

A mixture of 150 parts of β-diisopropylaminoethyl benzylcarbanilate, 173 parts of methyl bromide and 600 parts of chloroform is heated in a shielded pressure reactor at 80° C. for two days, cooled and treated with ether. The precipitated methobromide is recrystallized from ethyl acetate and isopropanol. The crystals melt at 153–155° C.

*Example 19*

A mixture of 10 parts of β-diisopropylaminoethyl benzylcarbanilate and 22.8 parts of methyl iodide in 32 parts of methyl ethyl ketone is heated at 85° C. It forms a crystalline methiodide which melts at 177–178° C. after recrystallization from ethanol.

*Example 20*

A solution of 50 parts of benzylcarbanilyl chloride and 40 parts of β-di-n-butylaminoethanol in 250 parts of benzene is refluxed for two days, cooled and extracted with dilute hydrochloric acid. The extract is made alkaline and extracted with ether. This extract is dried and evaporated to yield β-di-n-butylaminoethyl benzylcarbanilate which is distilled at 194–196° C. and 2 mm. pressure.

*Example 21*

An ether solution of 153 parts of N-(β-phenethyl)-aniline is added gradually with stirring to an ice cooled solution of 60 parts of phosgene in 700 parts of anhydrous ether. Toluene is added and, after standing for 12 hours, the reaction mixture is filtered and concentrated in vacuum.

A mixture of 165 parts of the N-(β-phenethyl)-carbanilyl chloride, 80 parts of diisopropylaminoethanol and 240 parts of methyl ethyl ketone is refluxed for two days, concentrated in vacuum, cooled and treated with ice, dilute hydrochloric acid and ether. The aqueous layer is separated, made alkaline and extracted with ether. The resulting extract is dried and evaporated yielding β-diisopropylaminoethyl N-(β-phenethyl)carbanilate which distills at about 210–212° C. and 3 mm. pressure.

80 parts of this ester and 114 parts of methyl iodide in 750 parts of chloroform are heated in a sealed vessel at 70° C. for 4 hours, concentrated, chilled and treated with ether. The resulting oil is separated and dissolved in a mixture of isopropanol and ethyl acetate. Upon chilling, the methiodide of β-diisopropylaminoethyl N-(β-phenethyl)carbanilate is obtained which melts at about 138–139° C. It has the structural formula

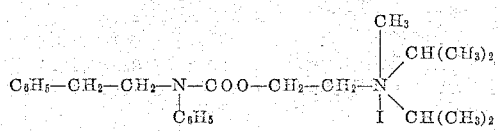

*Example 22*

An ether solution of 197 parts of N-(α-phenethyl)-aniline is added to a stirred solution of 71.5 parts of β-chloroethyl chlorocarbonate in 1100 parts of ether at 0° C. Benzene is added and stirring is continued for 10 hours. The reaction mixture is filtered and the filtrate is freed from solvent.

A mixture of 45 parts of the β-chloroethyl N-(α-phenethyl)carbanilate thus obtained, 20 parts of diethylamine, 2 parts of potassium iodide and 80 parts of methyl ethyl ketone is heated in a closed vessel at 80° C. for 12 hours, concentrated, cooled and made alkaline and extracted with dilute hydrochloric acid. The aqueous solution is extracted with ether and the ether extract is dried and evaporated to yield β-diethylaminoethyl N-(α-phenethyl)carbanilate which is distilled at about 178–180° C. and 1 mm. pressure. This compound forms a hydrochloride which, recrystallized from ethyl acetate, melts at 127–129° C.

*Example 23*

7 parts of β-diethylaminoethyl N-(α-phenethyl)-carbanilate are mixed with 17.3 parts of methyl bromide in 40 parts of methyl ethyl ketone. After one hour, the crystalline precipitate is collected on a filter and recrystallized from a mixture of isopropanol and ether. The methobromide thus obtained melts at 153–155° C. It has the structural formula

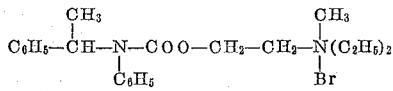

Example 24

An ether solution of 211 parts of N-(α-phenylpropyl)-aniline is added to a solution of 71.5 parts of β-chloroethyl chlorocarbonate in 1100 parts of ether with stirring at room temperature. After heating at reflux temperature for an hour the mixture is cooled and filtered. The filtrate is evaporated leaving a dark oily residue.

60 parts of the β-chloroethyl N-(α-phenylpropyl)-carbanilate thus obtained, 20 parts of diethylamine, and 2 parts of potassium iodide in 80 parts of methyl ethyl ketone are heated in a closed vessel at 80° C., concentrated and extracted with dilute hydrochloric acid. The acidic extract is rendered alkaline and extracted with ether. This extract is dried and evaporated to yield the β-diethylaminoethyl N-(α-phenylpropyl)carbanilate as an oil which is distilled at 172–175° C. and 1 mm. pressure. Its hydrochloride, crystallized from methyl ethyl ketone, melts at 153–154° C.

Example 25

A few minutes after mixing 80 parts of β-diethylaminoethyl N-(α-phenylpropyl)-carbanilate and 140 parts of methyl bromide in 400 parts of methyl ethyl ketone, a solid precipitate forms which is collected on a filter and washed with acetone and ether. The metho-bromide of β-diethylaminoethyl N-(α-phenylpropyl)carbanilate thus obtained melts at 173–174° C. It has the structural formula

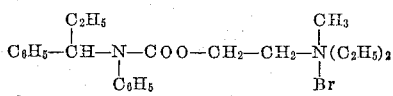

Example 26

A mixture of 10 parts of β-diethylaminoethyl N-(α-phenylpropyl)carbanilate and 14.2 parts of ethyl bromide in 75 parts of chloroform is heated in a closed vessel at 80° C. for 12 hours, concentrated, chilled and treated with ether. The precipitated ethobromide is recrystallized from methyl ethyl ketone and a small quantity of isopropanol. It melts at 176–177° C.

Example 27

A solution of 35.7 parts of β-chloroethyl chlorocarbonate in 350 parts of ether is added dropwise to a solution of 98.5 parts of N-(o-tolyl)benzylamine in 450 parts of benzene. After standing for 12 hours, the mixture is filtered and the filtrate is concentrated under vacuum. The residual oil is dissolved in 80 parts of methyl ethyl ketone and heated in a closed vessel at 70° C. with 2 parts of potassium iodide and 70 parts of diethylamine for three days. Then water is added and the mixture is concentrated on the steam bath, cooled and extracted with dilute hydrochloric acid. The extract is rendered alkaline and extracted with ether. This ether extract is dried and evaporated to yield the β-diethylaminoethyl N-benzyl-o-methylcarbanilate as an oil which is distilled at 175–180° C. and 2 mm. pressure. It forms a hydrochloride which, recrystallized from ethyl acetate and isopropanol, melts at 147–149° C.

Example 28

A mixture of 80 parts of β-diethylaminoethyl N-benzyl-o-methylcarbanilate and 87 parts of methyl bromide in 400 parts of methyl ethyl ketone is kept in a closed vessel for 10 hours, chilled and filtered. The methobromide thus obtained melts at 122–123° C. It has the structural formula

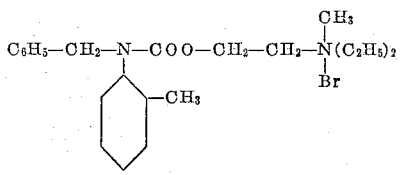

Example 29

In an ice bath a stirred solution of 116.5 parts of N-benzyl-α-naphthylamine in 600 parts of benzene is treated by the dropwise addition of a solution of 35.7 parts of β-chloroethyl chlorocarbonate in 500 parts of ether. Stirring is continued for 4 hours after which the mixture is permitted to stand at room temperature for 10 hours. Then it is filtered and the filtrate is freed from solvent. The residual oil is heated in a closed reactor with 80 parts of methyl ethyl ketone, 2 parts of potassium iodide and 70 parts of diethylamine at 70° C. for five days. The reaction mixture is extracted with dilute hydrochloric acid and the extract is washed with ether, made alkaline and extracted with ether. This extract is dried, filtered and evaporated to yield the β - diethylaminoethyl N - benzyl - N - (α - naphthyl)-carbamate which is distilled at 205–208° C. and 2 mm. pressure. Its hydrochloride, crystallized from ethyl acetate, melts at 142–144° C.

Example 30

A mixture of 10 parts of β-diethylaminoethyl N-benzyl-N-(α - naphthyl)carbamate and 17.3 parts of methyl bromide in 40 parts of methyl ethyl ketone is maintained in a closed vessel for 12 hours, cooled and treated with ether to cause formation of an oily methobromide. Crystallized from a mixture of ethyl acetate and isopropanol it melts at 158–159° C. This salt has the structural formula

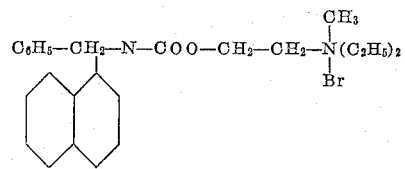

Example 31

An ether solution of 35.7 parts of β-chloroethyl chlorocarbonate is added to a benzene solution of 116.5 parts of N-(β-naphthyl)benzylamine with stirring in an ice bath. After storage at 0° C. for 12 hours, the mixture is filtered, and the filtrate is freed from solvent by vacuum distillation.

100 parts of the residual oil are dissolved in 80 parts of methyl ethyl ketone and heated with 2 parts of potassium iodide and 70 parts of diethylamine at 70° C. for five days. The reaction mixture is treated with water, concentrated and extracted with cold dilute hydrochloric acid. The extract is washed with ether, rendered alkaline and extracted with ether. This extract is dried and evaporated to yield the β-diethylaminoethyl N-benzyl-N-(β-naphthyl)carbamate. This forms a hydrochloride which, crystallized from isopropanol, melts at 152–154° C.

Example 32

An ether solution of 216 parts of δ-(m,p-xylyl)-butylaniline (distilled at 195–205° C. and 2 mm. pressure) is added to a stirred solution of 71.5 parts of β-chloroethyl chlorocarbonate in 1200 parts of ether. After refluxing for 30 minutes and standing at room temperature for two days, the reaction mixture is filtered and the filtrate is concentrated in vacuo.

A mixture of 75 parts of the residual oil, 12.5 parts of dimethylamine, 100 parts of methyl ethyl ketone and 2 parts of potassium iodide is heated in a closed vessel at 80° C. for 10 hours, concentrated and treated with ice, dilute hydrochloric acid and ether. The aqueous layer is separated, rendered alkaline and extracted with ether. This extract is dried and evaporated to yield the β-dimethylaminoethyl δ-(m,p-xylyl)butylcarbanilate which is distilled at about 185–195° C. and 2 mm. pressure. It has the structural formula

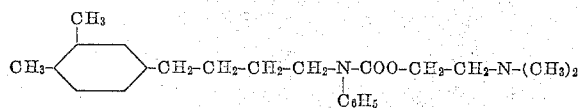

Example 33

89 parts of β-chloroethyl benzylcarbanilate, 57 parts of pyrrolidine and 1 part of potassium iodide are dissolved in 165 parts of methyl ethyl ketone and the resulting solution is refluxed for two days. The reaction mixture is evaporated on the steam bath to remove most of the solvent, the residue is mixed with ether, and the ether solution is filtered and evaporated. The residue of β-pyrrolidinoethyl benzylcarbanilate is distilled at 180–182° C. at 1.5 mm. pressure. It forms a crystalline hydrochloride which melts at 117–119° C. after recrystallization from isopropanol.

Example 34

10 parts of β-pyrrolidinoethyl benzylcarbanilate are dissolved in a cold solution of 23 parts of methyl iodide and 60 parts of methyl ethyl ketone and the resulting solution is kept at 0–5° C. for about 10 hours. The crystalline precipitate of β-pyrrolidinoethyl benzylcarbanilate methiodide is separated, washed and dried. It melts at 121–122° C.

Example 35

A mixture of 15 parts of β-pyrrolidinoethyl benzylcarbanilate, 22 parts of ethyl bromide and 40 parts of methyl ethyl ketone is heated in a closed vessel for 10 hours at 85° C. and then chilled. The precipitated ethobromide is collected on a filter and recrystallized from methyl ethyl ketone using charcoal decolorization. It melts at 117–118° C.

Example 36

A mixture of 10 parts of β-pyrrolidinoethyl benzylcarbanilate and 19 parts of ethyl iodide in 32 parts of methyl ethyl ketone is stored at 0° C. for 10 hours and then extracted with ether. The ethiodide solidifies on standing at 0° C. It melts at 111–112° C.

Example 37

12 parts of β-pyrrolidinoethyl benzylcarbanilate and 17 parts of n-propyl iodide are dissolved in 40 parts of methyl ethyl ketone and heated at 85° C. for 12 hours. On chilling a heavy crystalline precipitate of β-pyrrolidinoethyl benzylcarbanilate propiodide forms. This is removed and dried. It melts at 117–118° C.

Example 38

A mixture of 15 parts of β-pyrrolidinoethyl benzylcarbanilate and 26 parts of isopropyl iodide in 40 parts of methyl ethyl ketone is heated in a closed vessel at 85° C. and then stirred at 0° C. The precipitated isopropiodide melts at 132–133° C.

Example 39

A mixture of 15 parts of β-pyrrolidinoethyl benzylcarbanilate and 11 parts of benzyl chloride in 40 parts of methyl ethyl ketone is heated for 15 hours at 85° C. The solution is chilled and diluted with ether. The precipitate of the quaternary salt crystallizes on standing. The benzochloride melts at 123–124° C.

Example 40

15 parts of β-pyrrolidinoethyl benzylcarbanilate and 27 parts of ethylene bromohydrin in 40 parts of methyl ethyl ketone are heated at 85° C. for 36 hours. The hot reaction mixture is treated with activated charcoal, filtered, cooled and diluted with dry ether. The precipitate of the quaternary ammonium salt forms crystals. The hydroxyethobromide melts at 99–100° C. after recrystallization from isopropanol.

Example 41

15 parts of β-pyrrolidinoethyl benzylcarbanilate, 15 parts of ethyl bromoacetate and 40 parts of methyl ethyl ketone are mixed and heated at 85° C. for fifteen hours. The reaction mixture is chilled and diluted with dry ether. The precipitate of the quaternary ammonium salt crystallizes on standing. This is broken up and recrystallized from isopropanol. It melts at 142–143° C. and has the following formula

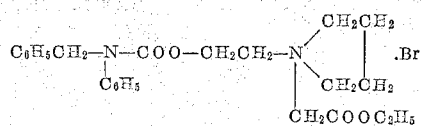

Example 42

A solution of 50 parts of benzylcarbanilyl chloride and 25 parts of 1-(β-hydroxyethyl)-2,5-dimethylpyrrolidine in 270 parts of benzene is heated at reflux temperature for two days, concentrated and treated with dilute hydrochloric acid. The aqueous layer is separated, washed with ether, rendered alkaline and extracted with ether. This extract is dried and evaporated to yield the β-(2,5-dimethylpyrrolidino)ethyl benzylcarbanilate which is distilled at 185–190° C. and 1 mm. pressure. It has the structural formula

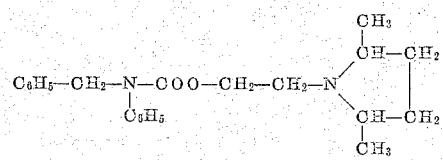

Example 43

A solution of 60 parts of β-chloroethyl benzylcarbanilate and 40 parts of piperidine in 250 parts of methyl ethyl ketone is heated at reflux temperature for 10 hours and concentrated. The residue is treated with ice, hydrochloric acid and ether and the aqueous layer is separated, made alkaline and extracted with ether. This extract is dried and evaporated to yield β-piperidinoethyl benzylcarbanilate which is distilled at 228–230° C. and 3 mm. pressure. Its hydrochloride, crystallized from isopropanol, melts at 141–142° C.

Example 44

Methyl bromide gas is passed into a solution of 10 parts of β-piperidinoethyl benzylcarbanilate in 40 parts of methyl ethyl ketone until 10 parts are taken up. On standing a heavy precipitate of the methobromide forms. This salt melts at 163–164° C.

Example 45

A solution of 19 parts of β-piperidinoethyl benzylcarbanilate and 26 parts of ethyl bromide in 40 parts of methyl ethyl ketone is heated in a closed vessel at 85° C. for 15 hours. On chilling a precipitate of the crystalline ethobromide forms. It melts at 133–135° C.

Example 46

A solution of 60 parts of β-chloroethyl benzylcarbanilate and 50 parts of 2-methylpiperidine (α-pipecoline) in 250 parts of methyl ethyl ketone is refluxed for 15 hours. The reaction mixture is evaporated and the residue mixed with ice, muriatic acid and ether. The aqueous layer is separated, made alkaline and ether extracted. The extract is dried and evaporated. The residue of β-(2-methylpiperidino)ethyl benzylcarbanilate forms a non-crystalline hydrochloride when dissolved in dry ether and heated with absolute alcoholic hydrogen chloride. This salt dissolves easily in water and forms a stable 10% solution suitable for pharmaceutical purposes.

*Example 47*

A mixture of 40 parts of benzylcarbanilyl chloride, 30 parts of 1-(β-hydroxyethyl)-2-methyl-5-ethylpiperidine, 15 parts of pyridine and 1800 parts of toluene is heated at reflux temperature for 10 hours, cooled and treated with dilute hydrochloric acid. The aqueous layer is separated, made alkaline and extracted with ether. This extract is dried and evaporated to yield the β-(2-methyl-5-ethylpiperidino)ethyl benzylcarbanilate which is distilled at 209–211° C. and 1 mm. pressure. Its hydrochloride, crystallized from a mixture of ethyl acetate and isopropanol, melts at 165–168° C. and has the structural formula:

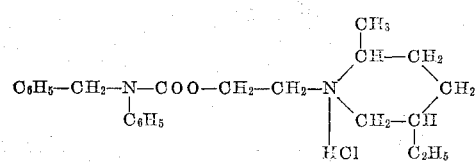

*Example 48*

A solution of 289 parts of β-chloroethyl benzylcarbanilate and 200 parts of N-monomethylpiperazine in 1750 parts of dry toluene is refluxed for 15 hours. An oily precipitate forms which solidifies on standing. The precipitate is removed by filtration and the filtrate is extracted with dilute muriatic acid. The acid extract is made alkaline, extracted with ether and the ether extract is washed and dried. On evaporation of the ether there is formed a solid residue of β-(4-methylpiperazino)-ethyl benzylcarbanilate. After recrystallization from petroleum ether, this basic ester melts at 96–97° C. It has the structural formula

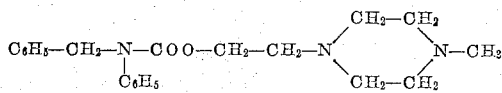

*Example 49*

A solution of 40 parts of β-chloroethyl benzylcarbanilate, 30 parts of morpholine and 1 part of potassium iodide in 250 parts of methyl ethyl ketone is refluxed for 15 hours. The reaction mixture is evaporated at 100° C., cooled and treated with dilute hydrochloric acid. The aqueous layer is separated, rendered alkaline and extracted with ether. This extract is dried and evaporated to yield the β-morpholinoethyl benzylcarbanilate which distills at 225–226° C. and 2 mm. pressure. It forms a crystalline hydrochloride which melts at 110–111° C.

*Example 50*

A mixture of 10 parts of β-morpholinoethyl benzylcarbanilate and 23 parts of methyl iodide in 40 parts of methyl ethyl ketone is kept at 0–5° C. for about 15 hours. The crystalline methiodide is removed and recrystallized from dilute isopropanol. It melts at 168–169° C.

*Example 51*

30 parts of benzylcarbanilyl chloride and 20 parts of 1-methyl-4-piperidinol in 260 parts of dry xylene are refluxed for 15 hours. The reaction mixture is chilled and decanted from the solid precipitate. The decanted liquid is extracted with dilute hydrochloric acid and the hydrochloric acid layer is made alkaline and extracted with ether. The ether extract is dried and evaporated. The residue of 1-methyl-4-piperidinyl benzylcarbanilate distills at 212–214° C. at 1 mm. pressure. It forms a non-crystalline hydrochloride which is readily soluble in water and forms a 10% aqueous solution suitable for medicinal purposes.

*Example 52*

A mixture of 7 parts of 1-methyl-4-piperidinyl benzylcarbanilate and 11.4 parts of methyl iodide in 20 parts of methyl ethyl ketone is maintained at 0° C. The resulting methiodide melts at 183–184° C.

*Example 53*

A solution of 30 parts of β-chloroethyl benzylcarbanilate, 25 parts of β-methylaminoethanol and 1 part of potassium iodide in 165 parts of methyl ethyl ketone is refluxed for two days. The reaction mixture is evaporated and the residue is mixed thoroughly with ice, hydrochloric acid and ether. The aqueous layer is removed, made alkaline and extracted with ether. This ether extract is dried and evaporated. The residue of β-[N-(β-hydroxyethyl)-N-methylamino]ethyl benzylcarbanilate is taken up in dry ether and heated with absolute alcoholic hydrogen chloride. The precipitate of the hydrochloride could not be crystallized. It is readily soluble in warm alcohol and isopropanol. The base has the structural formula

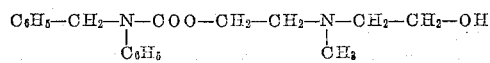

*Example 54*

A mixture of 49 parts of benzylcarbanilyl chloride and 35 parts of diallylaminoethanol in 1700 parts of toluene is refluxed for 10 hours, cooled, and treated with dilute hydrochloric acid. The aqueous layer is separated, made alkaline and extracted with ether. This extract is dried and evaporated to yield β-diallylaminoethyl benzylcarbanilate which is distilled at 205–208° C. and 3 mm. pressure.

*Example 55*

A mixture of 800 parts of p-chloroaniline and 379.5 parts of α-chlorotoluene in 2700 parts of benzene is refluxed for four days, cooled and filtered. Dilute hydrochloric acid is added to the filtrate. The solid precipitate is collected on a filter, suspended in water, treated with ammonia and extracted with a mixture of ether and benzene. This extract is dried and evaporated leaving the N-benzyl-p-chloroaniline which is distilled at 160–172° C. and 1 mm. pressure.

To a stirred and chilled solution of 70 parts of phosgene in 1100 parts of ether, a solution of 280 parts of this distillate in 900 parts of benzene is added dropwise. After standing for 10 hours the mixture is filtered and the filtrate is freed from solvents in vacuo. 212 parts of the residue and 145 parts of β-diisopropylaminoethanol in 2500 parts of toluene are heated at reflux for two days, cooled and treated with dilute hydrochloric acid. The aqueous layer is rendered alkaline and extracted with ether. This extract is dried and evaporated to yield the β-diisopropylaminoethyl N-benzyl-p-chlorocarbanilate which is distilled at 200–202° C. and 2 mm. pressure. On crystallization from ethyl acetate, its hydrochloride melts at 145–146° C.

*Example 56*

A mixture of 15 parts of β-diisopropylaminoethyl N-benzyl-p-chlorocarbanilate and 26 parts of methyl bromide in 75 parts of chloroform is heated in a closed vessel for 10 hours, concentrated, cooled and treated with ether. The initially oily precipitate solidifies on standing at 0° C. Recrystallized from a mixture of isopropanol and ethyl acetate, the methobromide melts at 146–147° C.

Example 57

350 parts of N-(p-methylbenzyl)-o-iodoaniline (prepared by refluxing 46 parts of o-iodoaniline and 14 parts of p-xylylchloride in benzene) are dissolved in ether and added gradually to an agitated and chilled ether solution of 67 parts of phosgene. After storage at 0° C. for 12 hours, the mixture is filtered and the filtrate is freed of solvents under vacuum.

385 parts of the N-(p-methylbenzyl)-o-iodocarbanilyl chloride and 150 parts of β-diethylaminoethanol are heated in 800 parts of toluene at reflux temperature for two days, cooled and extracted with dilute hydrochloric acid. The extract is washed with ether, made alkaline and extracted with ether. This extract is dried and evaporated under vacuum to yield the β-diethylaminoethyl N-(p-methylbenzyl)-o-iodocarbanilate which has the structural formula

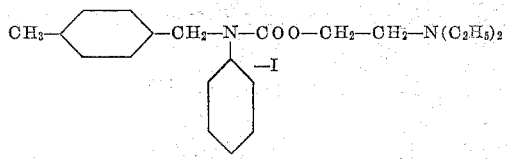

Example 58

A mixture of 150 parts of o-fluoroaniline and 100 parts of o-fluorobenzyl chloride in 700 parts of benzene is refluxed for three days, cooled and filtered. Addition of hydrochloric acid to the filtrate causes precipitation of the hydrochloride. The latter is suspended in water, treated with ammonia and extracted with ether. The ether extract is dried and vacuum distilled.

A solution of 283 parts of the N-(o-fluorobenzyl)-o-fluoroaniline in 1000 parts of benzene is added slowly to a solution of 70 parts of phosgene in 1100 parts of ether at 0° C. After standing at that temperature for a day, the reaction mixture is filtered and the filtrate is freed from solvent under vacuum.

A mixture of 283 parts of the residue and 117 parts of β-diethylaminoethanol in 250 parts of toluene is refluxed for a day, chilled and extracted with dilute hydrochloric acid. The extract is washed with ether, made alkaline and extracted with ether. This extract is dried and evaporated to yield the β-diethylaminoethyl N-(o-fluorobenzyl)-o-fluorocarbanilate which is distilled at about 205–215° C. and 2 mm. pressure.

Example 59

A mixture of 322 parts of p-chlorobenzyl chloride and 390.6 parts of aniline in 1400 parts of toluene is refluxed for three days, cooled and filtered. Addition of hydrochloric acid to the filtrate causes precipitation of the hydrochloride. This salt is suspended in water and the suspension is made alkaline and extracted with ether. The ether extract is dried and evaporated and the residue is distilled at 165–175° C. and 1 mm. pressure.

A dry ether solution of 235 parts of p-chlorobenzylaniline thus obtained is added to an ether solution of 67 parts of phosgene by gradual addition and with stirring, the total volume of ether being 1100 parts. After standing at 0° C. for a day, the reaction mixture is filtered and the solvent is concentrated in vacuo.

A mixture of 176 parts of the residue and 100 parts of β-diisopropylaminoethanol in 350 parts of toluene is refluxed for two days, cooled and extracted with dilute hydrochloric acid. The aqueous solution is made alkaline and extracted with ether. This extract is dried and evaporated to yield β-diisopropylaminoethyl p-chlorobenzylacarbanilate which is distilled at 205–210° C. and 2 mm. pressure. Its hydrochloride crystallized from ethyl acetate melts at 107–109° C.

Example 60

A mixture of 10 parts of β-diisopropylaminoethyl p-chlorobenzylcarbanilate and 17.3 parts of methyl bromide in 75 parts of chloroform is heated in a closed vessel at 80° C. for two days and then concentrated, cooled and treated with ether. The precipitated methobromide is recrystallized from ethyl acetate and isopropanol. It melts at 141–142° C. and has the structural formula

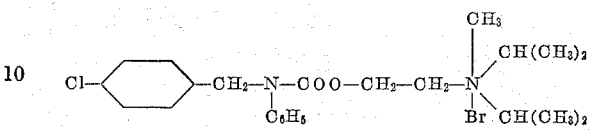

Example 61

A mixture of 40 parts of β-diisopropylaminoethyl p-chlorobenzylcarbanilate and 22.8 parts of methyl iodide in 75 parts of chloroform is heated in a closed vessel at 80° C. for 10 hours, concentrated, cooled and treated with ether. Recrystallized from isopropanol the methiodide melts at 158–159° C.

Example 62

A solution of 350 parts of N-(p-iodobenzyl)-p-methylaniline (prepared by refluxing in toluene 252.5 parts of p-iodobenzyl chloride and 225 parts of p-methylaniline) is dissolved in benzene and added slowly to a cooled and stirred solution of 70 parts of phosgene in 1500 parts of ether. After standing at 5° C. for a day the mixture is filtered and the solvents are removed under vacuum.

385 parts of the residual oil are refluxed for two days with 150 parts of δ-dimethylaminobutanol in 300 parts of toluene, cooled and treated with dilute hydrochloric acid and ether. The aqueous layer is separated, made alkaline and extracted with ether. This extract is dried and evaporated to yield the δ-dimethylaminobutyl N-(p-iodobenzyl)-p-methylcarbanilate as a high-boiling yellow oil which has the structural formula

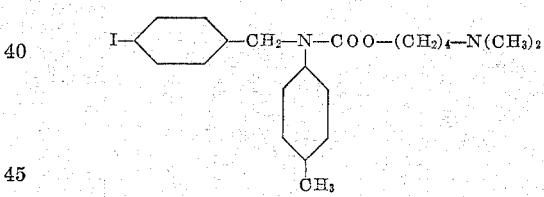

Example 63

A mixture of 544 parts of p-anisaldehyde, 372 parts of aniline, 660 parts of ethanol and 3 parts of platinum dioxide is hydrogenated in a bomb. The contents of the bomb are filtered and the filtrate is concentrated and cooled to yield a heavy precipitate.

A solution of 106.5 parts of the p-methoxybenzylaniline in 350 parts of toluene is added portionwise to a solution of 30 parts of phosgene in 600 parts of ether. After standing at room temperature for 12 hours, the mixture is filtered and the filtrate is concentrated under vacuum.

A mixture of 94 parts of N-(p-methoxybenzyl)carbanilyl chloride, 50 parts of β-diisopropylaminoethanol and 80 parts of methyl ethyl ketone is refluxed for two days, concentrated in vacuum, cooled and treated with ice, dilute hydrochloric acid and ether. The aqueous layer is separated, made alkaline and extracted with ether and the resulting extract is dried, filtered and concentrated to yield the β-diisopropylaminoethyl p-methoxybenzylcarbanilate.

A solution of 80 parts of this basic ester and 114 parts of methyl iodide in 750 parts of chloroform is heated in a sealed container at 70° C. for 3 hours, left at room temperature for 12 hours, concentrated, cooled and treated with ether. The resulting semisolid precipitate is separated and dissolved in a mixture of isopropanol and ethyl acetate. Upon cooling the methiodide of β-diisopropylaminoethyl p-methoxybenzylcarbanilate precipitates which melts at about 125–127° C. It has the structural formula

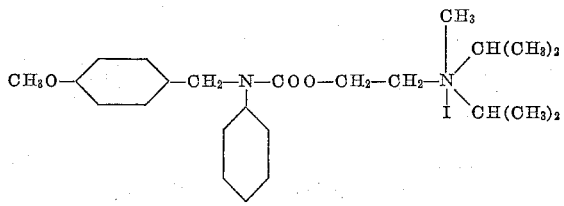

*Example 64*

A mixture of 123 parts of p-anisidine and 136 parts of p-anisaldehyde in 450 parts of benzene is refluxed for one hour under a water separating head. 18 parts of water are collected. After cooling the N-(p-anisal)-p-anisidine is collected on a filter, washed with cold benzene and dried. It melts at about 147–149° C.

A mixture of 118 parts of N-(p-anisal)-p-anisidine, 15 parts of Raney nickel and 350 parts of ethanol is hydrogenated with stirring in a Parr bomb at about 80° C. and 700 to 600 pounds pressure. The contents of the bomb are filtered while still hot and the filtrate is chilled. The N-(p-methoxybenzyl)-p-anisidine is collected on a filter. It melts at about 97–99° C.

A solution of 103 parts of N-(p-methoxybenzyl)-p-anisidine in 450 parts of benzene is added with stirring to a solution of 28.5 parts of β-chloroethyl chlorocarbonate in 570 parts of ether in the course of about 30 minutes. After stirring for two to three hours the mixture is filtered and the filtrate is concentrated in vacuum to yield the oily β-chloroethyl N-(methoxybenzyl)-p-methoxycarbanilate.

80 parts of this oil, 50 parts of diethylamine, 80 parts of methyl ethyl ketone and two parts of potassium iodide are heated in a sealed vessel at 70° C. for three days. The reaction mixture is then concentrated and treated with ice, ether and dilute hydrochloric acid. The aqueous layer is separated, made alkaline and extracted with ether. This extract is dried and evaporated to yield β-diethylaminoethyl N-(p-methoxybenzyl)-p-methoxycarbanilate.

A mixture of 80 parts of this basic ester and 114 parts of methyl iodide in 400 parts of methyl ethyl ketone is left at room temperature for an hour and then chilled. Crystallized from a mixture of methyl ethyl ketone and ethyl acetate, the methiodide of β-diethylaminoethyl N-(p-methoxybenzyl)-p-methoxycarbanilate melts at about 106–108° C. It has the structural formula

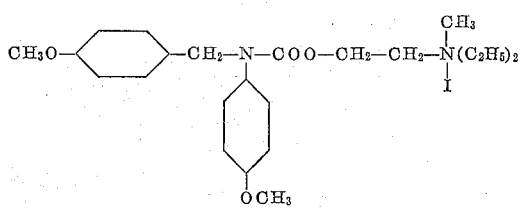

I claim:

1. An N-aralkyl-N-arylcarbamate of the structural formula

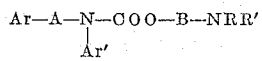

wherein Ar and Ar' are members of the class consisting of anisyl, isocyclic aryl hydrocarbon and isocyclic haloaryl radicals containing no more than 10 carbon atoms, A is a lower alkylene radical, B is a lower alkylene radical separating the oxygen and nitrogen atoms attached thereto by at least two carbon atoms and NRR' is a member of the class consisting of lower alkylamino, lower dialkylamino, lower dialkenylamino, lower hydroxyalkyl-alkylamino, 4-(lower alkyl)-piperazino, morpholino radicals and radicals of the type N͡Z wherein Z is an alkylene radical containing more than three and less than ten carbon atoms and wherein more than three and less than six carbon atoms are in nuclear position.

2. An N-phenylalkylcarbanilate of the structural formula

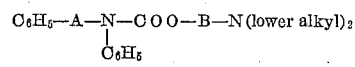

wherein A is a lower alkylene radical and B is a lower alkylene radical separating the oxygen and nitrogen atoms attached thereto by at least two carbon atoms.

3. An N-benzylcarbanilate of the structural formula

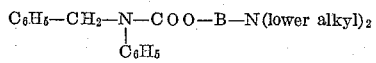

wherein B is a lower alkylene radical separating the oxygen and nitrogen atoms attached thereto by at least two carbon atoms.

4. β-Diisopropylaminoethyl N-benzylcarbanilate.

5. An N-phenylalkylcarbanilate of the structural formula

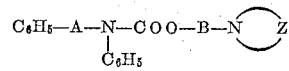

wherein A is a lower alkylene radical, B is a lower alkylene radical separating the oxygen and nitrogen atoms attached thereto by at least two carbon atoms and Z is a lower alkylene radical containing more than three and less than ten carbon atoms and wherein more than three and less than six carbon atoms are in nuclear position.

6. An N-phenylalkylcarbanilate of the structural formula

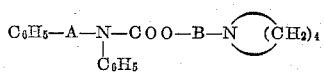

wherein A is a lower alkylene radical and B is a lower alkylene radical separating the oxygen and nitrogen atoms attached thereto by at least two carbon atoms.

7. β-Pyrrolidinoethyl benzylcarbanilate.

8. An N-(halophenyl)alkyl-N-arylcarbamate of the structural formula

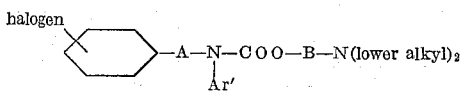

wherein Ar' is an isocyclic aryl hydrocarbon radical containing no more than 10 carbon atoms, A is a lower alkylene radical and B is a lower alkylene radical separating the oxygen and nitrogen atoms attached thereto by at least two carbon atoms.

9. A chlorophenylalkylcarbanilate of the structural formula

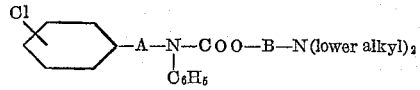

wherein A is a lower alkylene radical and B is a lower alkylene radical separating the oxygen and nitrogen atoms attached thereto by at least two carbon atoms.

10. A compound of the structural formula

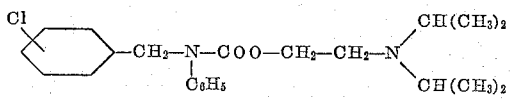

11. An (N-aralkyl)halocarbanilate of the structural formula

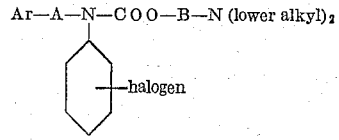

wherein Ar is an isocyclic aryl hydrocarbon radical containing no more than 10 carbon atoms, A is a lower alkylene radical and B is a lower alkylene radical separating the oxygen and nitrogen atoms attached thereto by at least two carbon atoms.

12. An (N-phenylalkyl)chlorocarbanilate of the structural formula

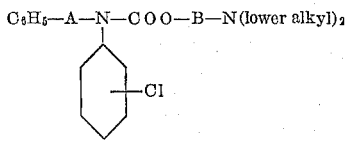

wherein A is a lower alkylene radical and B is a lower alkylene radical separating the oxygen and nitrogen atoms attached thereto by at least two carbon atoms.

13. A compound of the structural formula

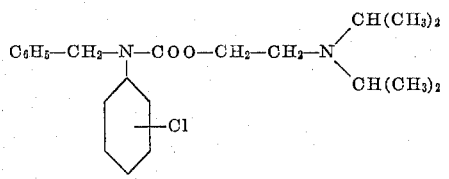

14. Di-n-propylaminoethyl N-benzylcarbanilate.

References Cited in the file of this patent

Jour. of Am. Pharm. Assoc., vol. XXXIII, pp. 193–204 (1944).